United States Patent [19]

Huyer

[11] Patent Number: 5,058,947
[45] Date of Patent: Oct. 22, 1991

[54] SLIDING ROOF FOR A VEHICLE

[75] Inventor: Johannes N. Huyer, Velserbroek, Netherlands

[73] Assignee: Vermeulen-Hollandia Octrooien II B.V., Netherlands

[21] Appl. No.: 444,376

[22] Filed: Dec. 1, 1989

[30] Foreign Application Priority Data

Dec. 8, 1988 [NL] Netherlands .......................... 8803010

[51] Int. Cl.$^5$ ............................................... B60J 7/047
[52] U.S. Cl. .................................... 296/216; 296/220; 296/223; 296/224
[58] Field of Search ................. 296/216, 220, 223, 224

[56] References Cited

FOREIGN PATENT DOCUMENTS 0131816 6/1987 Japan .................................... 296/223
2090565 7/1982 United Kingdom ................. 296/222

Primary Examiner—Dennis H. Pedder
Attorney, Agent, or Firm—Kinney & Lange

[57] ABSTRACT

A sliding roof for a vehicle comprises a panel (4) closing an opening (2) in a fixed roof (1) of the vehicle in a forward position and being movable, by operating a drive cable (12), to open positions wherein panel (4) overlaps the fixed roof (1) with a lifted rear edge (5). Near its front edge, panel (4) is pivotable about a horizontal transverse stud (8) supported by at least one front support (9) movable to an fro in the longitudinal direction of the vehicle. At a position behind front support (9), panel (4) is pivotally connected with at least one first guide element (26) on a lever (25) of an adjustment mechanism (24). Lever (25) is supported at its lower end for pivoting about a horizontal transverse pivot axis (28). The adjustment mechanism (24) includes an auxiliary lever (29) pivotable relative to lever (25) and which is connected to a track section (6) under panel (4) at a point spaced in longitudinal direction from the first guide element (26) when panel (4) is placed in upwardly tilted positions.

10 Claims, 5 Drawing Sheets

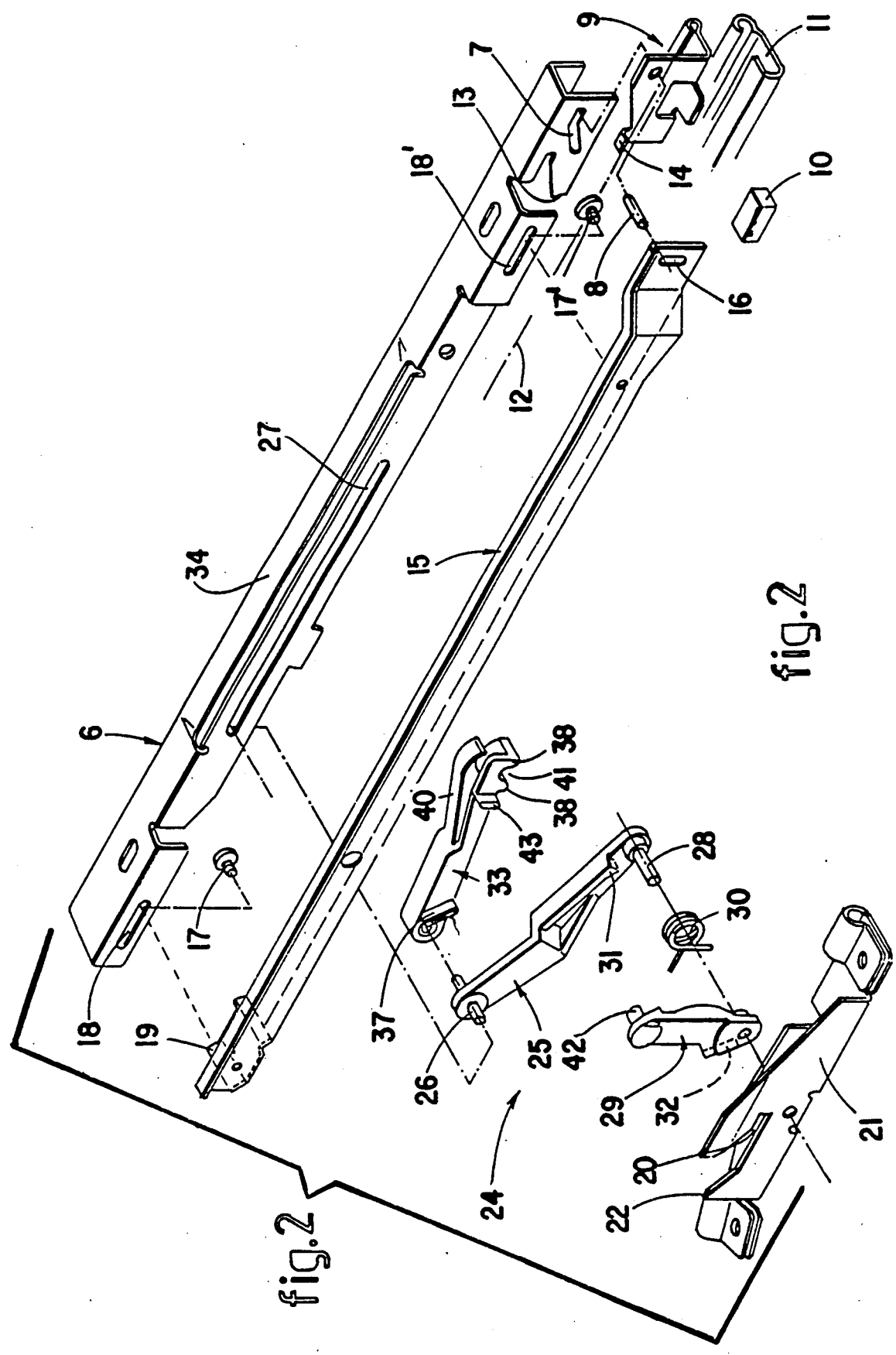

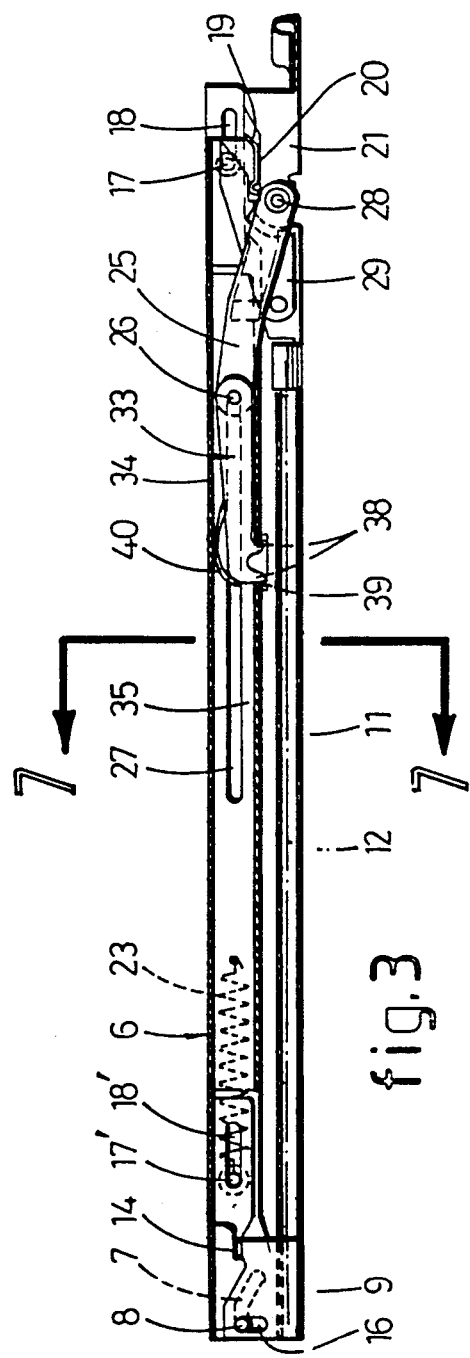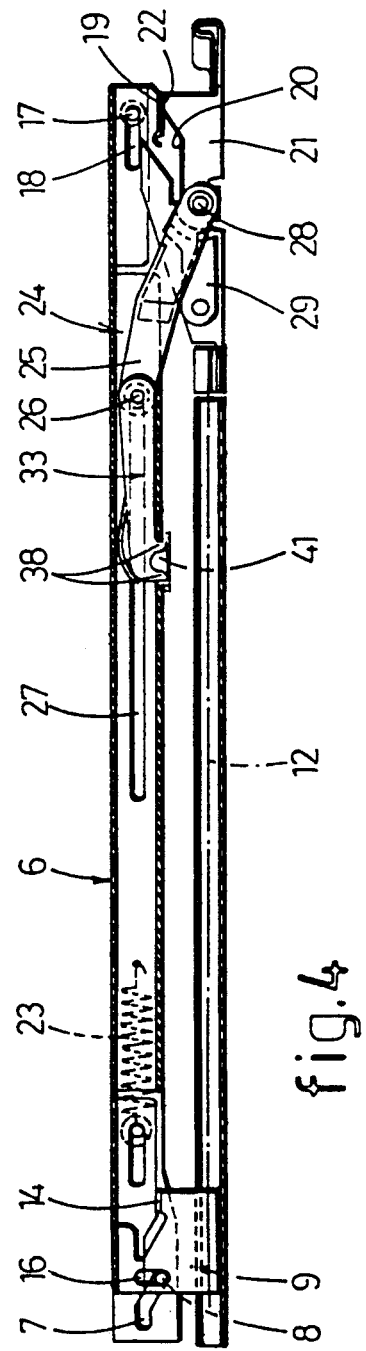

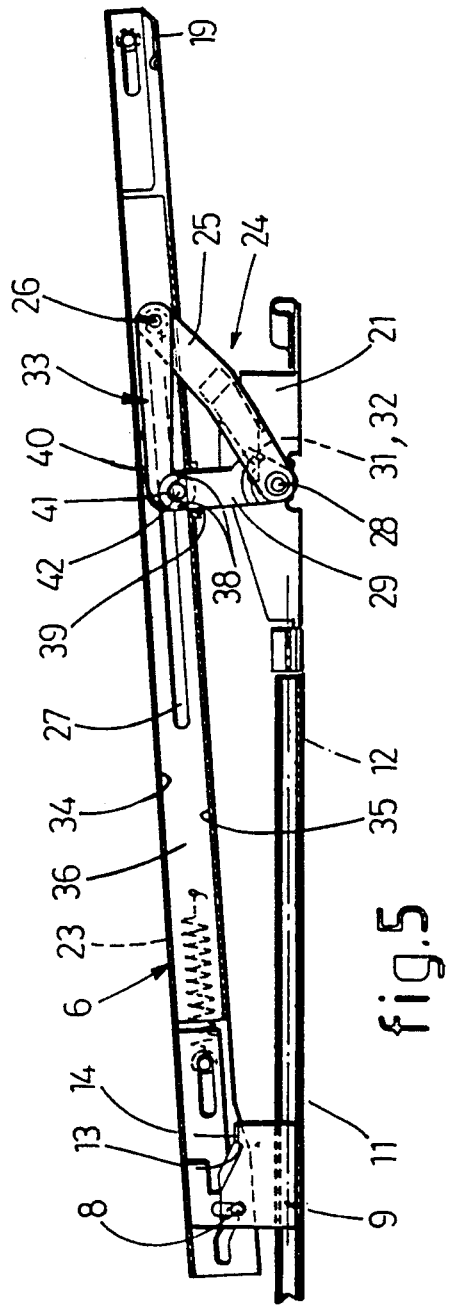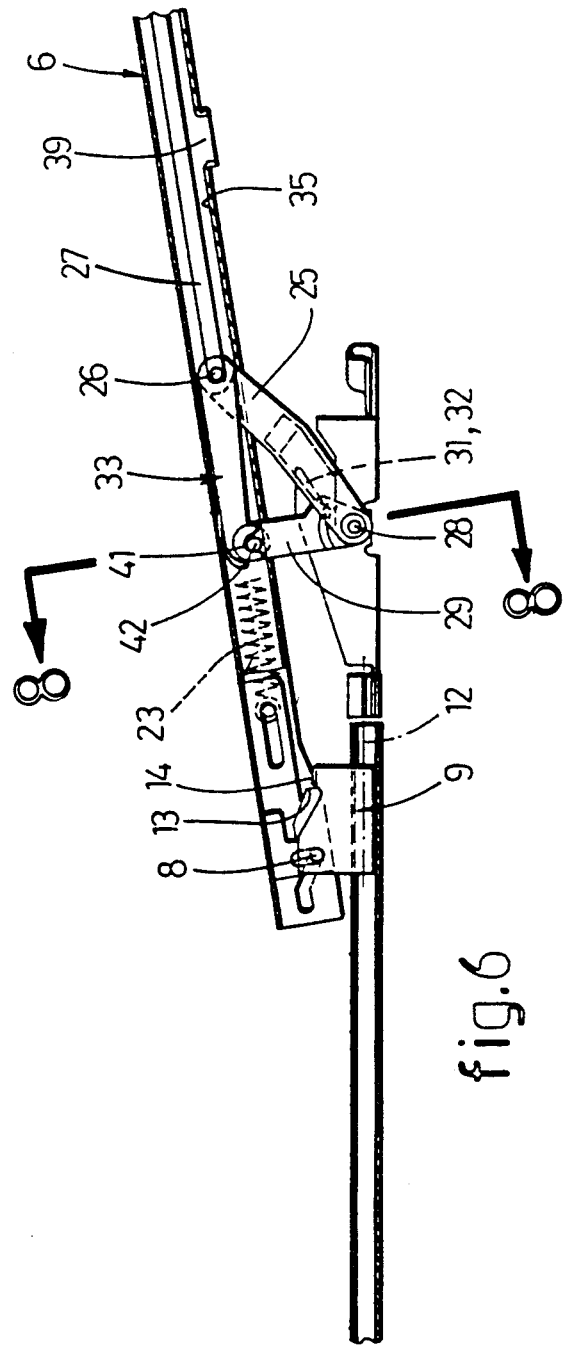

SLIDING ROOF FOR A VEHICLE

The invention relates to a sliding roof for a vehicle, comprising a panel closing an opening in the fixed roof of the vehicle in a foremost position and being movable, by operating a driving means, partially outside the roof opening to positions above the fixed roof with its rear edge lifted, the panel, near its front edge, being pivotable about a horizontal tranverse stud supported by at least one front support movable to and fro in the longitudinal direction of the vehicle, and, backward of the front support, the panel being pivotally in engagement with at least one first guide element on a lever of an adjustment means, the lever being supported at its lower end pivotable about a horizontal transverse pivot axis.

In known embodiments of such a sliding roof, notwithstanding the fact that the lever is sometimes in engagement with the panel by means of a plurality of guide elements, it can happen that the panel, in backwardly displaced positions, is subjected to undesired vertical displacements at the rear edge, for instance when the vehicle is driving at high speeds or over a rough road surface.

The invention has the object to provide a sliding roof of the type mentioned in the preamble, wherein this disadvantage is removed in an effective way.

For this purpose the sliding roof according the invention is characterized in that the adjustment means comprises an auxiliary lever pivotable relative to the lever and being in engagement with the panel at a point spaced in longitudinal direction from the first guide element of the lever at least in upwardly tilted positions of the panel.

In this manner, it is possible to hold the panel in two sufficiently spaced points by the lever and the auxiliary lever, respectively so that the panel is supported in a stable manner on the one hand, while on the other hand this does not adversely effect the built-in height of the sliding roof because the auxiliary lever is pivotable with respect to the lever so that in the closed position of the panel, the auxiliary lever can pivot with respect to the lever in a manner occupying little space in vertical height.

For this purpose it is preferred that the angle between the auxiliary lever and the lever is at a minimum in the closed position of the panel and is at a maximum in the fully opened position of the panel.

To obtain a simple structure it is favourable when the auxiliary lever is pivotable about the pivot axis of the lever.

In this way the lever and the auxiliary lever are commonly pivotable about the pivot axis.

In an embodiment of the sliding roof, wherein the drive means engages the front support and causes it to slide in the longitudinal direction of the vehicle in order to displace the panel, wherein the first guide element on the lever is rotatable and slidable in a longitudinal guide under the panel, and wherein the lever, when displacing the panel from the foremost position, reaches a position determined by a stop, whereafter the first guide element passes along the longitudinal guide; and vice versa, it is advantageously if the auxiliary lever is slidably in engagement with the panel by means of a second guide element, and the lever and the auxiliary lever are locked to prevent pivoting movements with respect to each other during the relative movement of the first guide element and the longitudinal guide of the panel.

Due to the blocking of the auxiliary lever with respect to the lever there is caused a fixed triangular structure between both guide elements and the common pivot axis of the lever and the auxiliary lever thereby effecting a very stable support of the panel.

Preferably the lever and the auxiliary lever are lockable with respect to each other by means of a connecting arm pivotally connected to the upper end of the lever on the one hand and adapted to come into engagement with the upper end of the auxiliary lever on the other hand, the engagement between the connecting arm and the auxiliary lever serving as stop for the lever.

In this way the lever, the auxiliary lever and the connecting arm form a stable closed triangle, and the free rotation to the lever in the first part of the backward displacement of the panel is prevented by the engagement of the auxiliary lever and the connecting arm during a further backward displacement of the panel.

In an embodiment of a sliding roof wherein the first guide element of the lever is locked by a locking means to prevent sliding movements thereof with respect to the longitudinal guide in foremost positions of the panel, it is advantageously when the locking means is formed on the connecting arm and the locking is released by the engagement of the auxiliary lever with the connecting arm.

Herein, it is favourable if the connecting arm is received in the second longitudinal guide, which is preferably open on one longitudinal side and comprises an opening on the lower side, wherein the connecting arm comprises a downwardly directed projection serving as locking means and being adapted to come into engagement with the opening of the longitudinal guide, a resilient means of the connecting arm urging the projection into the opening, the upper end of the auxiliary lever having a guide stud adapted to enter the longitudinal guide through the opening and to urge the projection out of the opening against the spring force of the resilient means thereby releasing the locking and being permitted to slide along the longitudinal guide.

A simple operation of the auxiliary lever is obtained when the spring means loads the auxiliary lever to its downwardly pivoted starting position, and the lever having a carrier means for carrying along the auxiliary lever beyond a certain position when it is pivoted upwardly.

The invention will hereafter be elicudated with reference to the drawing showing an embodiment of a sliding roof according to the invention by way of example.

FIG. 2 is an enlarged prospective view of the adjusting mechanism for adjusting the panel on one side thereof along line II—II of FIG. 1a, the parts being shown separate from each other.

FIG. 3–6 are enlarged sectional views along the line III—III in FIG. 7, wherein the adjusting mechanism is shown in several positions.

Figure 1A:
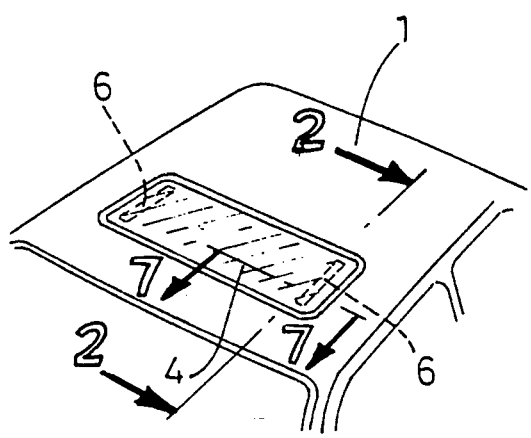
FIG. 1a and 1b are schematic perspective views of a vehicle roof provided with the sliding roof according the invention, wherein the panel of the sliding roof is shown in closed and opened positions.
Figure 1B:
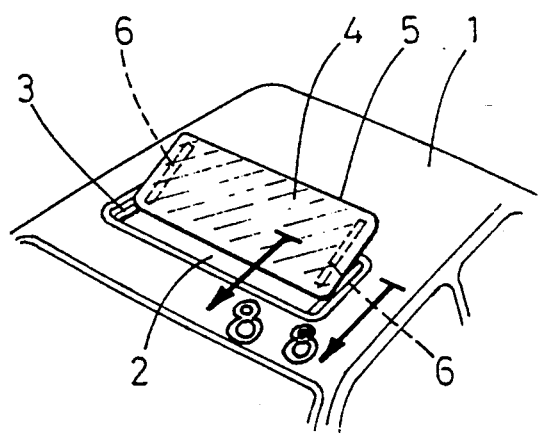

In the drawing there is shown an embodiment of the sliding roof for a vehicle, the fixed roof 1 of which is provided with an opening 2. The sliding roof comprises a panel 4 adjustably supported by a frame 3 and closing the opening 2 in the fixed roof 1 of the vehicle in the foremost closed position (FIG. 1a) and being movable, in an inclined position with its rear edge 5 lifted, in backward direction partially outside the roof opening 2 to positions above the fixed roof 1 (FIG. 1b).

For this purpose, there is provided on either side below the panel 4 a section 6 extending in longitudinal direction of the sliding roof. As shown in FIG. 2-7, each section 6 is provided at its front edge with a guide slot 7 inclining at least partially in backward and downward direction and receiving a transverse stud 8 connected to a front support 9 adapted to be moved to and fro in a guide rail 11 by means of a sliding shoe 10, the guide rail 11 extending in longitudinal direction of the sliding roof and being supported by the frame 3. For said movements there is provided a pivotable operation means (not shown) on the frame 3, that, when it is rotated, adjusts the drive wheel which is in engagement with two flexible pull and push cables 12. The end portions of this cables 12 extend in longitudinal direction of the sliding roof and engage the front support 9. Each guide slot 7 includes a slot portion joining to the upper front end of the inclined slot portion and extending in longitudinal direction of the respective section 6 in forward sense and, in the closed position of the panel 4, substantially horizontal.

At a small distance behind the guide slot 7 the section comprises a face conforming to the guide slot and joining at the rear end to a stop face 13 extending concentrically about the rear end of the guide slot 7 and being adapted to co-operate with a refracted locking lip 14 at the rear end of the front support 9 in order to lock the section 6 and the front support 9 from a relative sliding motion in backwardly displaced positions of the panel (FIG. 5 and 6).

Each section 6 co-operates with a connecting strip 15, the front end of which is attached to the transverse stud 8 of the respective front support 9 by means of a short vertical slot 16 so as to be pivotable and slidable in vertical direction, and the rear and front portions of which carry the guide pin 17, 17' which is slidable in a respective longitudinal slot 18, 18' in the section 6. Each connecting strip 15 carries near the rear end a locking means 19 formed by a flanged lip and in the closed position, being in engagement with a locking slot 20 open at the rear end and formed in a rear corner piece 21 attached to the frame 3. This locking slot 20 includes a substantially horizontal front portion and a rearwardly and upwardly inclined portion lying behind it. Behind the lower edge of each locking slot 20 is a substantially horizontal edge portion 22. Between each section 6 and the co-operating connecting strip 15 there is provided a spring 23 loading the connecting strip 15 in rearward direction and the section 6 in forward direction in order to prevent the section 6 from staying behind when the panel 4 is adjusted back to the closed position.

Each section 6 is further supported by an adjustment means 24 at a point spaced behind the front guide slot 7. This adjustment means 24 includes a lever 25 having at its upper end a transverse pin 26 serving as guide element and engaging rotably and slidably into a slot 27 in the section 6 serving as longitudinal guide. The lower end of the lever 25 is freely pivotally supported on the rear corner piece 21 by means of a pivot pin 28. The pivot pins 28 of both levers 25 are aligned to each other and extend horizontal in transverse direction of the sliding roof.

On the same pivot pin 28 there is also provided a pivotable auxiliary lever 29. A torsion spring 30 acting upon the auxiliary lever 29 loads the auxiliary lever 29 to its forwardly and downwardly pivoted starting position. The lever 25 and the auxiliary lever 29 are provided on their sides facing each other with carrier means 31, 32 respectively determining the maximum angle between the lever 25 and the auxiliary lever 29.

Figure 7:
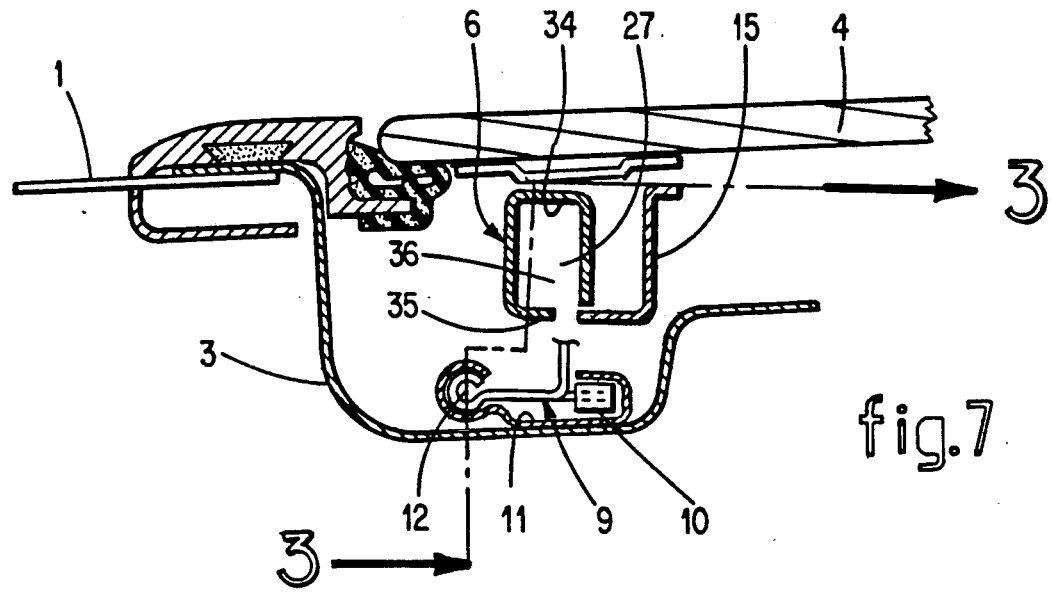
FIG. 7 is an enlarged sectional view along the lines VII—VII in FIG. 1a and FIG. 3 with elements removed to improve clarity.
Figure 8:
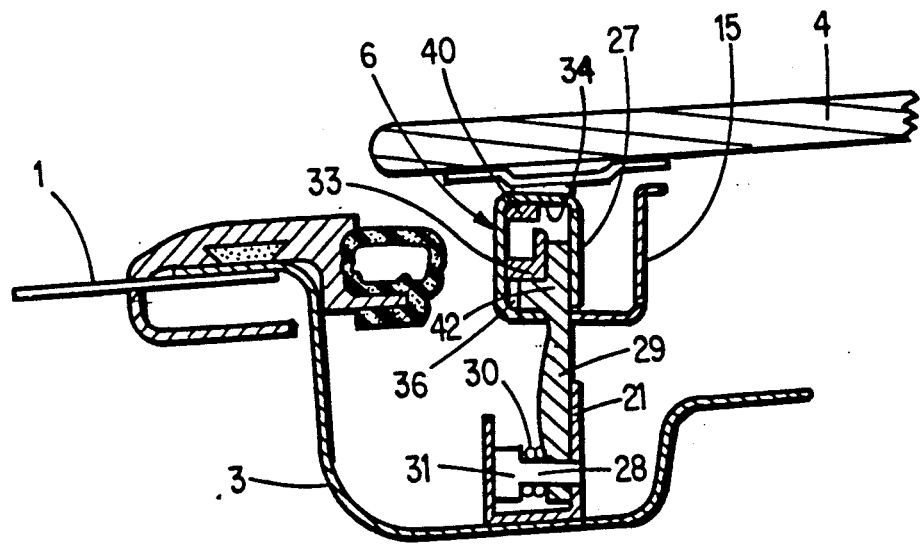

The transverse pin 26 at the upper end of the lever 25 is pivotally connected at the end facing away from the slot 27 in the section 6 with a connecting arm 33 supporting the transverse pin 26 in a stable manner and being slidably guided in a longitudinal guide 36 formed by an upper flange 34 and a lower flange 35 of the section 6 (see FIG. 7). A spacer 37 on the connecting arm 33 facilitates the mounting operation of the lever 25 to the connecting arm 33.

The connecting arm 33 has at its front end a downwardly directed projection 38 projecting into an opening 39 in the lower flange 35 of section 6 when the connecting arm 33 is in its rear position in the longitudinal guide 36 and consequently when the transverse pin 26 of the lever 25 is in its rear position in the slot 27 of the section 6, so as to lock the connecting arm 33 from sliding motion. A resilient lip 40, which is formed on the upper side of the connecting arm 33 and is leaning against the upper flange 34 of the section 6, urges the projection 38 in the opening 39 in the lower flange 35.

In the projection 38 of the connecting arm 33 there is formed a recess 41 adapted to receive a guide stud 42 at the upper end of the auxiliary lever 29 therein when the guide stud 42 of the auxiliary lever 29 enters the longitudinal guide 36 through the opening 39. In aid of the connection of the connecting arm 33 to the auxiliary lever 29 and the lever 25 the lower flange 35 of the longitudinal guide 36 terminates in transverse direction spaced from the side flange of the section 6 having the slot 27 formed therein so that the longitudinal guide 36 is open on the side facing the slot 27. A lateral projection 43 on the connecting arm 33 ensures a proper guiding of the guide stud 42 of the auxiliary lever in the recess 41 of the connecting arm 33.

The operation of the sliding roof according to the invention is as follows:

FIG. 3 shows the foremost closed and locked position of the panel which is not shown but is attached to the sections 6. In its position, each section 6 is locked in upward direction from an undesired displacement by the engagement of the locking means 19 at the upper end of the connecting strip 15 into the locking slot 20, by the engagement of the flanged locking lip 14 on the front support 9 with the locking face 13 of the section 6 and by the engagement of the transverse stud 8 of the front support 9 with the horizontal front portion of the guide slot 7 in the section 6. The connecting strip 15 is in its foremost position with respect to the section 6. The lever 25 and the auxiliary lever 29 are in their maximum forwardly and downwardly pivoted starting positions in which the angle between the lever 25 and the auxiliary lever 29 is at a minimum. The transverse pin 26 at the upper end of the lever 25 is held in its hindmost position in the slot 27 of the section 6 by the engagement of the projection 38, which is formed on the connecting arm 33 connecting to the transverse pin 26, into the opening 39 in the lower flange 35 of the section 6.

The projection 38 on the connecting arm 33 is urged into the opening 39 by the resilient lip 40.

In the position of FIG. 4 each front support 9 is displaced a small distance backwardly by the respective pull and push cable 12, the connecting strip 15 being carried along backwardly by the engagement of the pin 8 in the vertical slot 16, while the section 6 is substantially maintained in its position in longitudinal direction, because the section 6 is retained in longitudinal direction by the adjustment means 24 and is loaded forwardly by the spring 23 with respect to the connecting strip 15. However, due to the rearward displacement of the front support 9 each section 6 is slidably displaced upwardly in vertical direction caused by the displacement of the transverse stud 8 of the front support 9 in the inclined slot portion of the guide slot 7 in the section 6 and by the displacement of the locking means 19 of the connecting strip 15 along the inclined portion of the locking slot 20. The guide pins 17, 17' of the connecting strip 15 have passed through the guide slot 18, 18' in rearward direction. The lever 25 is slightly pivoted upwardly as a consequence of the small vertical displacement of the section 6. The auxiliary lever 29, however, is held in its lower postion by the torsion spring 30.

In the position of FIG. 5, the front support 9 is moved a substantial distance backwardly by the pull and push cable 12. Herewith the lever 25 is pivoted upwardly and backwardly about the pivot pin 28, whereby the panel connected to each section 6 is brought into a rearwardly and upwardly inclined position and is also slid rearwardly. Due to the engagement of the projection 38 of the connecting arm 33 connected to the lever 25 into the opening 39 of the section 6, the connecting arm 33 and consequently the transverse pin 26 at the upper end of the lever 25 is always locked from sliding motion along the section 6. In a certain pivotal position of the lever 25 (not shown) the carrier means 31 thereof has come into engagement with the carrier means 32 of the auxiliary lever 29 so as to cause the auxiliary lever 29 to pivot against the force of the torsion spring 30 upwardly along with the lever 25 upon further pivoting movement thereof. Then the maximum angle between the lever 25 and the auxiliary lever 29 has been reached. In the position of FIG. 5 in which, as a consequence of the position of the lever 25, the section 6 is displaced slightly downwardly again at the position of the adjustment means 24, the guide stud 42 at the upper end of the auxiliary lever 29 has entered the longitudinal guide 36 through the opening 39 in the lower flange 35 of the section 6 and has come into engagement with the recess 41 in the projection 38 of the connecting arm 33. Due to the weight of the panel and to the downwardly directed movement of the transverse pin 26 of the lever 25, the guide stud 42 on the auxiliary lever 29 has displaced a connecting arm 33 slightly upwardly at the position of the projection 38 against the force of the resilient lip 40. As a result thereof, the projection 38 has come out of engagement with the opening 39 in the lower flange 35 of the longitudinal guide 36 thereby releasing the locking from sliding motion of the connecting arm 33 in the longitudinal guide 36 and consequently of the transverse pin 26 in the slot 27. A further rearward displacement of the front support 9 will thus result in a sliding motion of the section 6 along the adjustment means 4 wherein the transverse pin 26 passes through the slot 27 and the connecting arm 33 together with the guide stud 42 of the auxiliary lever 29 pass through the longitudinal guide 36 in the section.

FIG. 6 illustrates the maximum rearwardly displaced position of the front support 9 and consequently of the section 6 and the panel 4. Herein, the transverse pin 26 at the upper end of the lever 25 has come into engagement with the front end of the slot 27 in the section 6. During the displacement of the section 6 between the positions of FIG. 5 and 6, the lever 25 and the auxiliary lever 29 are locked against relative pivoting movements by the connecting arm 33 extending between the upper end of the lever 25 and the upper end of the auxiliary lever 29. The connecting arm 33 and the auxiliary lever 29 are held in engagement with each other because the guide stud 42 at the upper end of the auxiliary lever 29 rests onto the lower flange 35 of the longitudinal guide 36 so that the guide stud 42 is confined in the recess 41 of the connecting arm 33. The lever 25, the auxiliary lever 29 and the connecting arm 33 together form a stable closed triangle of which two angular points are slidably connected to the panel at a fixed distance while the third angular point coincides with the pivot pin 28, so that the triangle as a whole is permitted to pivot about the pivot pin 28 so as to be able to adjust to the pivotal position of the section 6.

In this way, there is effected a very stable support of the panel 4 since the sections 6 thereof are supported additionally to the transverse stud 8 of the front support 9 onto further points having a substantial spacing. As a consequence, undesired displacements of the rear edge 5 of the panel 4 in the opened position thereof are prevented in an effective way.

To bring the panel 4 back from the opened position to the closed position the same operation has to be effected as discribed hereinbefore and shown in FIG. 3-6 wherein, of course, the movements of the adjustment mechanism take place in reverse sense. The sliding motion of each section 6 along the respective adjustment means 24 terminates when the transverse pin 26 of the lever 25 has reached the rear end of the slot 27 and the projection 38 of the connecting arm 33 has been urged into the opening 39 of the lower flange 35 by the resilient lip 40. The connecting arm 33 and the transverse pin 26 of the lever 25 are then again locked from sliding motion, whereafter the connection of the connecting arm 33 with the auxiliary lever 29 is released and the auxiliary lever 29 and the lever 25 are pivoted back to their initial positions.

The invention is not restricted to the embodiment described hereinbefore and shown in the drawing by way of example, which can be varied in different ways within the scope of the invention.

I claim:

1. A sliding roof for a vehicle having a fixed roof (1) with an opening (2) therein, comprising:
   a frame (3) adapted to be fitted to the fixed roof (1) of the vehicle and carrying a longitudinal guide rail (11);
   a panel (4) having front and rear edges and being adapted to move between a foremost closed position closing the opening (2) in the fixed roof (1) of the vehicle and opened positions in which the panel, with its rear edge lifted, is partially outside the roof opening and partially overlapping the fixed roof;
   a driving means (12) provided in the frame (3) and being operatively connected to the panel (4) in order to move it;

front support means movable to and fro in the longitudinal guide rail (11) and carrying horizontal transverse stud means (8) pivotally supporting the panel near its front edge; and adjustment means (24) including:
  a main lever (25) to lift the panel (4), said lever being supported at its lower end in a manner pivotable about a horizontal transverse pivot axis (28), the main lever (25) carrying a first guide element (26) pivotally connected to the panel (4) in a point spaced rearward of the stud means (8) of the front support means; and
  an auxiliary lever (29) pivotable relative to the main lever (25) and cooperating with it and having connecting means connected to the panel (4) at a point spaced in longitudinal direction from the first guide element (26) of the main lever (25) at least in positions of the panel (4) in which the rear edge of the panel (4) is lifted in order to additionally support the panel (4) in these positions.

2. A sliding roof for a vehicle having a fixed roof (1) with an opening (2) therein, comprising:
  a frame (3) adapted to be fitted to the fixed roof (1) of the vehicle and carrying a longitudinal guide rail (11);
  a panel (4) having front and rear edges and being adapted to move between a foremost closed position closing the opening (2) in the fixed roof (1) of the vehicle and opened positions in which the panel, with its rear edge lifted, is partially outside the roof opening and partially above the fixed roof;
  driving means (12) provided in the frame (3) and being operatively connected to the panel (4) in order to move it;
  front support means movable to and fro in the longitudinal guide rail (11) and carrying horizontal transverse stud means (8) pivotally supporting the panel near its front edge; and
  adjustment means (24) including:
    a main lever (25) to lift the panel (4), said lever being supported at its lower end in a manner pivotable about a horizontal transverse pivot axis (28), the main lever (25) carrying a first guide element (26) pivotally connected to the panel (4) in a point spaced rearward of the stud means (8) of the front support means; and
    an auxiliary lever (29) pivotable relative to the main lever (25) and having connecting means connected to the panel (4) at a point spaced in longitudinal direction from the first guide element (26) of the main lever (25) at least in positions of the panel (4) in which its rear edge is lifted in order to additionally support the panel (4) in these positions, wherein the auxiliary lever (29) and the main lever (25) form an angle therebetween which is at a minimum in the closed position of the panel (4) and is at a maximum in a fully opened position of the panel (4).

3. A sliding roof for a vehicle having a fixed roof (1) with an opening (2) therein, comprising:
  a frame (3) adapted to be fitted to the fixed roof (1) of the vehicle and carrying a longitudinal guide rail (11);
  a panel (4) having front and rear edges and being adapted to move between a foremost closed position closing the opening (2) in the fixed roof (1) of the vehicle and opened positions in which the panel, with its rear edge lifted, is partially outside the roof opening and partially above the fixed roof;
  driving means (12) provided in the frame (3) and being operatively connected to the panel (4) in order to move it;
  front support means movable to and fro in the longitudinal guide rail (11) and carrying horizontal transverse stud means (8) pivotally supporting the panel near its front edge; and
  adjustment means (24) including:
    a main lever (25) to lift the panel (4), said lever being supported at its lower end in a manner pivotable about a horizontal transverse pivot axis (28), the main lever (25) carrying a first guide element (26) pivotally connected to the panel (4) in a point spaced rearward of the stud means (8) of the front support means; and
    an auxiliary lever (29) pivotable about the pivot axis (28) of the main lever (25) and having connecting means connected to the panel (4) at a point spaced in longitudinal direction from the first guide element (26) of the main lever (25) at least in positions of the panel (4) in which its rear edge is lifted in order to additionally support the panel (4) in these positions.

4. A sliding roof according to claim 1, wherein the drive means (12) engages the front support means (9) and causes it to slide in the longitudinal guide rail (11) in order to displace the panel (4), the first guide element (26) on the main lever (25) being rotatable and slidable in a longitudinal guide (27) under the panel (4), the main lever (25), when displacing the panel (4) from the foremost position, reaching a position determined by the auxiliary lever (29) coming into engagement with a track section (6) under the panel (4), whereafter the first guide element passes along the longitudinal guide (27); and wherein the auxiliary lever (29) is slidably in engagement with the track section (6) under the panel (4) by means of a second guide element (42) as said connecting means, and the main lever (25) and the auxiliary lever (29) being locked by a first locking means to prevent pivoting movements with respect to each other during the relative movement of the first guide element (26) within the longitudinal guide (27) of the panel (4).

5. A sliding roof according to claim 4, wherein the second guide element (42) is slidable along a second longitudinal guide (36) of said track section of the panel (4).

6. A sliding roof according to claim 4, wherein the first locking means comprises a connecting arm (33) pivotally connected to an upper end of the main lever (25) on the one hand and adapted to come into engagement with an upper end of the auxiliary lever (29) on the other hand.

7. A sliding roof according to claim 6, wherein the first guide element (26) of the main lever (25) is locked by a second locking means (38) to prevent sliding movements thereof with respect to the longitudinal guide (27) in foremost positions of the panel (4), and wherein the second locking means (38) is formed on the connecting arm (33), and the second locking is released by the engagement of the auxiliary lever (29) with the connecting arm (33).

8. A sliding roof according to claim 7, wherein the connecting arm (33) is received in a second longitudinal guide (36) of said track section, which comprises an opening (39) on a lower side, and wherein the connecting arm (33) comprises a downwardly directed projection (38) serving as the second locking means and adapted to come into engagement with the opening (39) of the longitudinal guide (36), a resilient means (40) of the connecting arm (33) urging the projection (38) into the opening, the upper end of the auxiliary lever (29) having a guide stud (42) adapted to enter the second longitudinal guide (36) through the opening (39) and to urge the projection (38) out of the opening (39) against spring force of the resilient means (40) thereby releasing the locking and being permitted to slide along a lower flange (35) of the second longitudinal guide (36).

9. A sliding roof according to claim 8, wherein the projection (38) of the connecting arm (33) has a recess (41) on a lower side thereof to receive the guide stud (42) of the auxiliary lever (29).

10. A sliding roof according claim 1, wherein spring means (30) load the auxiliary lever (29) to its downwardly pivoted starting position, and the main lever (25) having a carrier means (31) for carrying along the auxiliary lever (29) beyond a certain position when it is pivoted upwardly.

* * * * *